United States Patent [19]

Ushigome et al.

[11] Patent Number: 4,735,859
[45] Date of Patent: Apr. 5, 1988

[54] MAGNESIA AGGREGATE FOR REFRACTORY ARTICLE AND METHOD FOR MANUFACTURING SAME

[75] Inventors: Susumu Ushigome, Nagoya; Kikuo Ariga, Mizunami, both of Japan

[73] Assignee: Tokyo Yogyo Kabushiki Kaisha, Tokyo, Japan

[21] Appl. No.: 903,681

[22] Filed: Sep. 4, 1986

[30] Foreign Application Priority Data

Dec. 5, 1985 [JP] Japan ................ 60-273774
Dec. 6, 1985 [JP] Japan ................ 60-275639
Dec. 9, 1985 [JP] Japan ................ 60-276434

[51] Int. Cl.$^4$ .................. C04B 33/32; C04B 35/04
[52] U.S. Cl. ...................... 428/404; 428/703; 427/376.1; 427/376.2
[58] Field of Search ............. 264/120; 428/404, 703, 428/406, 402; 427/215, 376.1, 376.2

[56] References Cited

U.S. PATENT DOCUMENTS

| | | | |
|---|---|---|---|
| 3,069,292 | 12/1962 | Alexander et al. | 428/404 |
| 3,322,515 | 5/1967 | Dittrich et al. | |
| 3,987,135 | 10/1976 | Eigner et al. | 264/120 X |
| 4,593,007 | 6/1986 | Novinski | 428/404 X |
| 4,632,876 | 12/1986 | Laird et al. | 428/404 |

FOREIGN PATENT DOCUMENTS

| | | | |
|---|---|---|---|
| 1160350 | 8/1958 | Fed. Rep. of Germany | 428/703 |
| 2810180 | 9/1979 | Fed. Rep. of Germany | 428/703 |
| 51-30561 | 9/1976 | Japan . | |
| 0136166 | 10/1980 | Japan | 428/703 |
| 7810667 | 4/1980 | Netherlands | 428/703 |
| 877312 | 9/1961 | United Kingdom . | |
| 981404 | 1/1965 | United Kingdom . | |

*Primary Examiner*—Nancy Swisher
*Attorney, Agent, or Firm*—Frishauf, Holtz, Goodman & Woodward

[57] ABSTRACT

A magnesia aggregate for a refractory article, which comprises: a core portion comprising magnesia; a covering layer excellent in slag penetration resistance, which comprises a refractory material excellent in slag penetration resistance and covers the surface of said core portion; and an intermediate layer excellent in slag penetration resistance, formed between said core portion and said covering layer through combination thereof. Said magnesia aggregate is manufactured by: forming, on the surface of a core portion which comprises magnesia and has a particle size of from 40 μm to 10 mm, a covering layer which comprises a powdery refractory material excellent in slag penetration resistance and has a covering thickness of from 20 μm to 2.0 mm, to prepare a green aggregate; and firing said green aggregate at a temperature of from 1,700° to 2,200° C. for a period of time of 4 to 10 hours, to form an intermediate layer excellent in slag penetration resistance between said core portion and said covering layer through combination thereof, thereby manufacturing a magnesia aggregate comprising said core portion, said covering layer and said intermediate layer.

16 Claims, 1 Drawing Sheet

MAGNESIA AGGREGATE FOR REFRACTORY ARTICLE AND METHOD FOR MANUFACTURING SAME

FIELD OF THE INVENTION

The present invention relates to a magnesia aggregate excellent in slag penetration resistance, which is used when manufacturing a refractory article.

BACKGROUND OF THE INVENTION

A magnesia aggregate constituting part of a magnesia brick is generally excellent in erosion resistance against basic slags such as converter slag, but is poor in slag penetration resistance.

The poor slag penetration resistance of the magnesia aggregate is attributable to the following cause. The magnesia aggregate more specifically comprises a silicate matrix having a low melting point, and a plurality of particles of periclase (MgO) having a high melting point of 2,800° C., which are dispersed throughout the silicate matrix. When molten slag comes into contact with the surface of the magnesia aggregate having the above-mentioned structure, the silicate matrix having the low melting point melts and molten slag penetrates into gaps between the particles of periclase which then float in the molten silicate matrix. This causes loosening of the surface layer structure of the magnesia aggregate, thus allowing molten slag to penetrate further deeply into the interior from the surface of the magnesia aggregate.

When molten slag penetrates into the surface layer of the magnesia aggregate as described above, a degraded layer easily peeled off by a change in temperature is formed on the surface layer of the magnesia aggregate, leading to a lower thermal spalling resistance of the magnesia aggregate.

In order to solve the above-mentioned problems, a magnesia aggregate for a refractory article and a method for manufacturing same are disclosed in Japanese Patent Publication No. 51-30,561, dated Sept. 1, 1976 (hereinafter referred to as the "prior art"). The method for manufacturing a magnesia aggregate for a refractory article of the prior art comprises the following steps: heating sludgy magnesium hydroxide to dry same; forming said dried magnesium hydroxide into a formed body; provisionally firing said formed body into a formed body comprising magnesia; forming again said formed body comprising magnesia under a high pressure into a green aggregate; and firing said green aggregate.

According to the above-mentioned prior art, in which the green aggregate is formed under a high pressure, the resultant magnesia aggregate for a refractory article has a high density and slag penetration resistance of the aggregate is somewhat improved. However, since the basic structure of the aggregate does not change, a remarkable improvement of slag penetration resistance cannot be expected.

Under such circumstances, there is a strong demand for the development of a magnesia aggregate for a refractory article, which is remarkably excellent in slag penetration resistance, and a method for manufacturing same, but such an aggregate and a manufacturing method thereof have not as yet been proposed.

SUMMARY OF THE INVENTION

An object of the present invention is therefore to provide a magnesia aggregate for a refractory article, which is remarkably excellent in slag penetration resistance, and a method for manufacturing same.

In accordance with one of the features of the present invention, there is provided a magnesia aggregate for a refractory article, characterized by comprising:

a core portion comprising magnesia (MgO);

a covering layer excellent in slag penetration resistance, which comprises a refractory material excellent in slag penetration resistance and covers the entire surface of said core portion; and an intermediate layer excellent in slag penetration resistance, formed between said core portion and said covering layer through combination of said core portion and said covering layer.

Furthermore, in accordance with another one of the features of the present invention, there is also provided a method for manufacturing a magnesia aggregate for a refractory article, characterized by comprising the steps of:

preparing a core portion which comprises magnesia (MgO) and has a particle size within the range of from 40 $\mu$m to 10 $\mu$m;

forming, on the entire surface of said core portion, a covering layer excellent in slag penetration resistance, which comprises a powdery refractory material excellent in slag penetration resistance and has a covering thickness within the range of from 20 $\mu$m to 2.0 mm, to prepare a green aggregate having the double structure; and firing said green aggregate at a temperature within the range of from 1,700° to 2,200° C. for a period of time within the range of from 4 to 10 hours, to form an intermediate layer excellent in slag penetration resistance between said core portion and said covering layer through combination of said core portion and said covering layer;

thereby manufacturing a magnesia aggregate for a refractory article, which comprises said core portion, said covering layer and said intermediate layer.

DETAILED DESCRIPTION OF PREFERRED EMBODIMENTS

From the above-mentioned point of view, extensive studies were carried out in order to develop a magnesia aggregate for a refractory article, which is remarkably excellent in slag penetration resistance, and a method for manufacturing same. As a result, there was obtained a finding that it is possible to remarkably improve slag penetration resistance of a magnesia aggregate for a refractory article by forming a covering layer excellent in slag penetration resistance on the entire surface of a core portion comprising magnesia.

The present invention was made on the basis of the above-mentioned finding. The magnesia aggregate for a refractory article, which is remarkably excellent in slag penetration resistance, and a method for manufacturing same of the present invention are described below with reference to the drawings.

Figure 1:
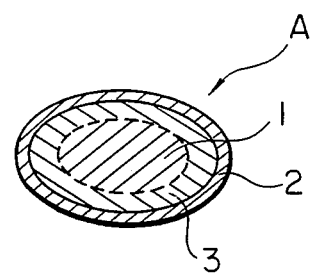
FIG. 1 is a cross-sectional view illustrating an embodiment of the magnesia aggregate for a refractory article of the present invention.

FIG. 1 is a cross-sectional view illustrating an embodiment of the magnesia aggregate A for a refractory article of the present invention. In FIG. 1, a core portion 1 comprises magnesia (MgO). The entire surface of the core portion 1 is covered with a covering layer 2 excellent in slag penetration resistance, which comprises a refractory material excellent in slag penetration resistance. The covering layer 2 comprises at least one metal oxide selected from the group consisting of chromium oxide ($Cr_2O_3$), alumina ($Al_2O_3$) and magnesium chromate ($MgCrO_4$) which form spinel in combination with magnesia (MgO). An intermediate layer 3 excellent in slag penetration resistance is formed between the core portion 1 and the covering layer 2 through combination of the core portion 1 and the covering layer 2.

Figure 2:
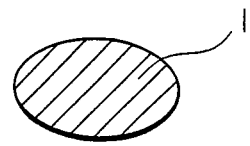
FIG. 2 is a cross-sectional view of the core portion used for the magnesia aggregate for a refractory article of the present invention.
Figure 3:
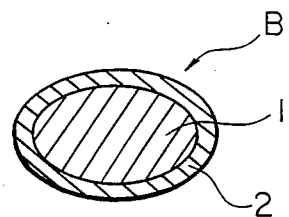
FIG. 3 is a cross-sectional view illustrating a green aggregate before firing for the magnesia aggregate for a refractory article of the present invention.

The above-mentioned magnesia aggregate A for a refractory article of the present invention is manufactured as follows. As shown in FIG. 2, the core portion 1, which comprises magnesia (MgO) and has a particle size within the range of from 40 μm to 10 mm, is prepared. Then, as shown in FIG. 3, the covering layer 2 excellent in slag penetration resistance, which comprises at least one powdery metal oxide excellent in slag penetration resistance such as chromium oxide ($Cr_2O_2$), alumina ($Al_2O_3$) and magnesium chromate ($MgCrO_4$) as described above and has a covering thickness within the range of from 20 μm to 2.0 mm, is formed on the entire surface of the core portion 1, to prepare a green aggregate B having the double structure. Then, the thus prepared green aggregate B is fired at a temperature within the range of from 1,700° to 2,200° C. for a period of time within the range of from 4 to 10 hours, to form, as shown in FIG. 1, an intermediate layer 3 excellent in slag penetration resistance between the core portion 1 and the covering layer 2 through combination of the core portion 1 and the covering layer 2, thereby manufacturing the magnesia aggregate A comprising the core portion 1, the covering layer 2 and the intermediate layer 3.

The above-mentioned core portion 1 may be prepared by heating sludgy magnesium hydroxide ($Mg(OH)_2$) into powdery magnesia (MgO), forming the thus obtained powdery magnesia (MgO) into a formed body having a particle size within the range of from 40 μm to 10 mm, and provisionally firing the formed body into the core portion 1. A single particle having a particle size within the range of from 40 μm to 10 mm of magnesium carbonate ore ($MgCO_3$) may be used as the core portion 1.

According to the above-mentioned magnesia aggregate A for a refractory article of the present invention, when the covering layer 2 comes into contact with molten slag having a temperature of about 1,600° C., the reaction between the covering layer 2 and molten slag increases the melting point of molten slag which comes into contact with the covering layer 2. Molten slag therefore becomes harder to penetrate into the magnesia aggregate A. A similar phenomenon occurs also in the intermediate layer 3.

Calcium oxide (CaO) which forms a mixture with magnesia (MgO) may be used as a material for the covering layer 2. Also when calcium oxide (CaO) is used as a material for the covering layer 2, slag penetration resistance of the magnesia aggregate A is improved for the same reason as described above. Furthermore, titania ($TiO_2$) or manganese oxide ($MnO_2$), both of which form a compound in combination with magnesia (MgO), may be used as a material for the covering layer 2. When titania ($TiO_2$) or manganese oxide ($MnO_2$) is used as a material for the covering layer 2, slag penetration resistance of the magnesia aggregate A is improved for the following reason, in addition to the above-mentioned reason. Titania ($TiO_2$) and manganese oxide ($MnO_2$) have a melting point not much higher than that of molten slag, so that the covering layer 2 is partly melted by molten slag, thus eliminating part of pores dispersed throughout the covering layer 2. This improves slag penetration resistance of the magnesia aggregate A. The same phenomenon occurs also in the intermediate layer 3.

Now, the method for manufacturing the magnesia aggregate for a refractory article of the present invention is described more in detail by means of examples.

EXAMPLE 1

Sludgy magnesium hydroxide ($Mg(OH)_2$) received in a refractory container was charged, together with the container, into a shuttle kiln and heated to a temperature of 900° C. for two hours to obtain powdery magnesia (MgO). The heating rate to 900° C. was 300° C. per hour. Then, the thus obtained powdery magnesia (MgO) was formed by a briquetting machine into an almond-shaped formed body having a particle size comprising a longer diameter of 10 mm and a shorter diameter of 5 mm. The thus obtained formed body was charged into a rotary kiln and provisionally fired at a temperature of 1,100° C. for two hours to prepare a core portion 1 comprising magnesia (MgO). Then, the thus prepared core portions 1 in an amount of 100 weight parts were charged, together with 5 weight parts aqueous solution of magnesium chloride ($MgCl_2$) and 1 weight part powdery chromium oxide ($Cr_2O_3$), into a mixer and mixed together for five minutes to wet the surfaces of the core portions 1 with the aqueous solution of magnesium chloride ($MgCl_2$) containing powdery chromium oxide ($Cr_2O_3$) Subsequently, 4 weight parts powdery chromium oxide ($Cr_2O_3$) were charged into the mixer and mixed together with the thus surface-wetted core portions 1 in the amount of 100 weight parts for seven minutes to form a covering layer 2 comprising chromium oxide ($Cr_2O_3$) and having a covering thickness of about 1.8 mm, on the surface of each core portion 1 and thus to prepare green aggregates B having the double structure. Then, the thus prepared green aggregates B were charged into a drying oven and heated to a temperature of 100° C. for drying. Finally, the thus dried green aggregates B were charged into a rotary kiln and fired at a temperature of 1,900° C. for eight hours to manufacture the magnesia aggregate of the present invention No. 1.

EXAMPLE 2

Core portions 1 comprising magnesia (MgO) and having the same particle size as that of the core portions 1 in Example 1 were prepared in the same manner as in Example 1. Then, the thus prepared core portions 1 in an amount of 100 weight parts were charged, together with 8 weight parts aqueous solution of magnesium chloride ($MgCl_2$) and 1 weight part powdery titania ($TiO_2$), into a mixer and mixed together for five minutes to wet the surfaces of the core portions 1 with the aqueous solution of magnesium chloride ($MgCl_2$) containing powdery titania ($TiO_2$). Subsequently, 4 weight parts powdery titania ($TiO_2$) were charged into the mixer and mixed together with the thus surface-wetted core portions 1 in the amount of 100 weight parts for seven minutes to form a covering layer 2 comprising titania ($TiO_2$) and having a covering thickness of about 1.1 mm, on the surface of each core portion 1 and thus to prepare green aggregates B having the double structure. Then, the thus prepared green aggregates B were dried and fired under the same conditions as in Example 1 to manufacture the magnesia aggregate of the present invention No. 2.

EXAMPLE 3

Core portions 1 comprising magnesia (MgO) and having the same particle size as that of the core portions 1 in Example 1 were prepared in the same manner as in Example 1. Then, the thus prepared core portions 1 in an amount of 100 weight parts were charged, together with 8 weight parts aqueous solution of magnesium chloride ($MgCl_2$) and 1 weight part powdery manganese oxide ($MnO_2$), into a mixer and mixed together for five minutes to wet the surfaces of the core portions 1 with the aqueous solution of magnesium chloride ($MgCl_2$) containing powdery manganese oxide ($MnO_2$) Subsequently, 4 weight parts powdery manganese oxide ($MnO_2$) were charged into the mixer and mixed together with the thus surface-wetted core portions 1 in the amount of 100 weight parts for seven minutes to form a covering layer 2 comprising manganese oxide ($MnO_2$) and having a covered thickness of about 1.0 mm on the surface of each core portion 1 and thus to prepare green aggregates B having the double structure. Then, the thus prepared green aggregates B were dried and fired under the same conditions as in Example 1 to manufacture the magnesia aggregate of the present invention No. 3.

EXAMPLE 4

Core portions 1 comprising magnesia (MgO) and having the same particle size as that of the core portions 1 in Example 1 were prepared in the same manner as in Example 1. Then, the thus prepared core portions 1 in an amount of 100 weight parts were charged, together with 8 weight parts aqueous solution of calcium chloride ($CaCl_2$) and 1 weight part powdery calcium hydroxide ($Ca(OH)_2$), into a mixer and mixed together for five minutes to wet the surfaces of the core portions 1 with the aqueous solution of calcium chloride ($CaCl_2$) containing powdery calcium hydroxide ($Ca(OH)_2$). Subsequently, 8 weight parts powdery calcium hydroxde ($Ca(OH)_2$) were charged into the mixer and mixed together with the thus surface-wetted core portions 1 in the amount of 100 weight parts for seven minutes to form a covering layer 2 comprising calcium hydroxide ($Ca(OH)_2$) and having a covering thickness of about 2.0 mm, on the surface of each core portion 1 and thus to prepare green aggregates B having the double structure. Then, the thus prepared green aggregates B were dried and fired under the same conditions as in Example 1 to manufacture the magnesia aggregate of the present invention No. 4. Calcium hydroxide ($Ca(OH)_2$) forming the covering layer 2 was converted into calcium oxide (CaO) during the above-mentioned firing.

EXAMPLE 5

Magnesium carbonate ore ($MgCO_3$) was crushed by means of an impeller breaker into particles having a particle size within the range of from 5 to 10 mm. Each single particle thus obtained of the magnesium carbonate ore ($MgCO_3$) was used as a core portion 1. Then, the core portions 1 in an amount of 100 weight parts were charged, together with 8 weight parts aqueous solution of magnesium chloride ($MgCl_2$), into a mixer and mixed together for five minutes to wet the surfaces of the core portions 1 with the aqueous solution of magnesium chloride ($MgCl_2$). Subsequently, 8 weight parts powdery alumina ($Al_2O_3$) were charged into the mixer and mixed together with the thus surface-wetted core portions 1 in the amount of 100 weight parts for seven minutes to form a covering layer 2 comprising alumina ($Al_2O_3$) and having a covering thickness of about 1.2 mm, on the surface of each core portion 1 and thus to prepare green aggregates B having the double structure. Then, the thus prepared green aggregates B were charged into a drying oven and heated to a temperature of 100° C. for drying. Finally, the thus dried green aggregates B were charged into a rotary kiln and fired at a temperature of 1,600° C. for eight hours to manufacture the magnesia aggregate of the present invention No. 5. Magnesium carbonate ($MgCO_3$) forming the core portion 1 was converted into magnesia (MgO) during the above-mentioned firing.

EXAMPLE 6

Core portions 1 comprising magnesium carbonate ($MgCO_3$) and having the same particle size as that of the core portions 1 in Example 5 were prepared in the same manner as in Example 5. Then, the thus prepared core portions 1 in an amount of 100 weight parts were charged, together with 5 weight parts aqueous solution of magnesium chloride ($MgCl_2$), into a mixer and mixed together for five minutes to wet the surfaces of the core portions 1 with the aqueous of magnesium choloride ($MgCl_2$). Subsequently, 4 weight parts powdery titania ($TiO_2$) were charged into the mixer and mixed together with the thus surface-wetted core portions 1 in the amount of 100 weight parts for seven minutes to form a covering layer 2 comprising titania ($TiO_2$) and having a covering thickness of about 1.1 mm, on the surface of each core portion 1 and thus to prepare green aggregates B having the double structure. Then, the thus prepared green aggregates B were dried and fired under the same conditions as in Example 5 to manufacture the magnesia aggregate of the present invention No. 6.

EXAMPLE 7

Core portions 1 comprising magnesium carbonate ($MgCO_3$) and having the same particle size as that of the core portions 1 in Example 5 were prepared in the same manner as in Example 5. Then, the thus prepared core portions 1 in an amount of 100 weight parts were charged, together with 8 weight parts aqueous solution of magnesium chloride ($MgCl_2$), into a mixer and mixed together for five minutes to wet the surfaces of the core portions 1 with the aqueous solution of magnesium chloride ($MgCl_2$).

Subsequently, 4 weight parts powdery manganese oxide ($MnO_2$) were charged into the mixer and mixed together with the thus surface-wetted core portions 1 in the amount of 100 weight parts for seven minutes to form a covering layer 2 comprising manganese oxide ($MnO_2$) and having a covering thickness of about 1.0 mm, on the surface of each core portion 1 and thus to prepare green aggregates B having the double structure. The thus prepared green aggregates B were dried and fired under the same conditions as in Example 5 to manufacture the magnesia aggregate of the present invention No. 7.

EXAMPLE 8

Core portions 1 comprising magnesium carbonate ($MgCO_3$) and having the same particle size as that of the core portions 1 in Example 5 were prepared in the same manner as in Example 5. Then, the thus prepared core portions 1 in an amount of 100 weight parts were charged, together with 8 weight parts aqueous solution of calcium chloride ($CaCl_2$) and 1 weight part powdery calcium hydroxide ($Ca(OH)_2$), into a mixer and mixed together for five minutes to wet the surfaces of the core portions 1 with the aqueous solution of calcium chloride ($CaCl_2$) containing powdery calcium hydroxide ($Ca(OH)_2$). Subsequently, 8 weight parts powdery calcium hydroxide ($Ca(OH)_2$) were charged into the mixer and mixed together with the thus surface-wetted core portions 1 in the amount of 100 weight parts for seven minutes to form a covering layer 2 comprising calcium hydroxide ($Ca(OH)_2$) and having a covering thickness of about 1.9 mm, on the surface of each core portion 1 and thus to prepare green aggregates B having the double structure. The thus prepared green aggregates B were dried and fired under the same conditions as in Example 5 to manufacture the magnesia aggregate of the present invention No. 8.

The chemical compositions of the above-mentioned magnesia aggregates of the present invention (hereinafter referred to as the "aggregate(s) of the invention") Nos. 1 to 4 are shown, together with that of the conventional magnesia aggregate (hereinafter referred to as the "aggregate for comparison") No. 1, in Table 1. The chemical compositions of the aggregates of the invention Nos. 5 to 8 are shown, together with that of the aggregate for comparison No. 2, in Table 2. The aggregate for comparison No. 1 was manufactured by charging the core portion 1 comprising magnesia (MgO) prepared in the above-mentioned Example 1, the surface of which was not covered by the covering layer 2, into the rotary kiln, and firing same. The aggregate for comparison No. 2 was manufactured by charging the core portion 1 comprising magnesium carbonate ($MgCO_3$) prepared in the above-mentioned Example 5, the surface of which was not covered by the covering layer 2, into the rotary kiln, and firing same.

TABLE 1

| | | $SiO_2$ | $Al_2O_3$ | $Fe_2O_3$ | $Cr_2O_3$ | $TiO_2$ | $MnO_2$ | CaO | (wt. %) MgO |
|---|---|---|---|---|---|---|---|---|---|
| Aggregate of the invention | No. 1 | 0.42 | 0.08 | 0.07 | 4.38 | — | — | 1.05 | 93.60 |
| | No. 2 | 0.40 | 0.08 | 0.07 | — | 4.87 | — | 1.04 | 92.98 |
| | No. 3 | 0.40 | 0.08 | 0.07 | — | — | 4.89 | 1.05 | 93.11 |
| | No. 4 | 0.38 | 0.07 | 0.06 | — | — | — | 9.21 | 88.69 |
| Aggregate for comparison | No. 1 | 0.42 | 0.08 | 0.07 | — | — | — | 1.10 | 98.01 |

TABLE 2

| | | $SiO_2$ | $Al_2O_3$ | $Fe_2O_3$ | $Cr_2O_3$ | $TiO_2$ | $MnO_2$ | CaO | (wt. %) MgO |
|---|---|---|---|---|---|---|---|---|---|
| Aggregate of the invention | No. 5 | 2.87 | 7.13 | 1.73 | — | — | — | 0.21 | 87.23 |
| | No. 6 | 2.97 | 0.68 | 1.78 | — | 3.94 | — | 0.22 | 90.35 |
| | No. 7 | 2.97 | 0.68 | 1.78 | — | — | 3.89 | 0.22 | 90.44 |
| | No. 8 | 2.92 | 0.67 | 1.76 | — | — | — | 5.81 | 88.83 |
| Aggregate for comparison | No. 2 | 3.09 | 0.71 | 1.86 | — | — | — | 0.23 | 94.10 |

The values of physical properties for the aggregates of the invention Nos. 1 to 4 and for the aggregate for comparison No. 1 are shown in Table 3. The values of physical properties for the aggregates of the invention Nos. 5 to 8 and for the aggregate for comparison No. 2 are shown in Table 4.

TABLE 3

| | | Porosity (%) | Water absorption (%) | Apparent specific gravity | Bulk specific gravity |
|---|---|---|---|---|---|
| Aggregate of the invention | No. 1 | 1.1 | 0.3 | 3.58 | 3.54 |
| | No. 2 | 1.1 | 0.3 | 3.57 | 3.53 |
| | No. 3 | 1.9 | 0.5 | 3.57 | 3.50 |
| | No. 4 | 1.9 | 0.6 | 3.53 | 3.46 |
| Aggregate for comparison | No. 1 | 2.4 | 0.8 | 3.56 | 3.47 |

TABLE 4

| | | Porosity (%) | Water absorption (%) | Apparent specific gravity | Bulk specific gravity |
|---|---|---|---|---|---|
| Aggregate of the invention | No. 5 | 2.1 | 0.6 | 3.55 | 3.47 |
| | No. 6 | 1.2 | 0.3 | 3.53 | 3.48 |
| | No. 7 | 2.0 | 0.6 | 3.53 | 3.46 |
| | No. 8 | 2.1 | 0.7 | 3.49 | 3.40 |
| Aggregate for comparison | No. 2 | 5.9 | 1.7 | 3.52 | 3.31 |

As is clear from Table 3, the aggregates of the invention Nos. 1 to 4 have porosity and water absorption lower than those of the aggregate for comprison No. 1. This suggests that the aggregates of the invention Nos. 1 to 4 are superior to the aggregate for comparison No. 1 in slag penetration resistance. As is clear from Table 4, the aggregates of the invention Nos. 5 to 8 have porosity and water absorption lower than those of the aggregate for comparison No. 2. This suggests that the aggregates of the invention Nos. 5 to 8 are superior to the aggregate for comparison No. 2 in slag penetration resistance.

Then, the aggregates of the invention Nos. 1 to 4 and the aggregate for comparison No. 1 were dipped into molten converter slag having a basicity of 3 and a temperature of 1,600° C. in a graphite crucible to investigate the slag penetration depth into each of the tested aggregates and the amount of expansion thereof. The results are shown in Table 5.

TABLE 5

|  |  | Slag penetration depth (mm) | Amount of expansion of aggregate (mm) |
|---|---|---|---|
| Aggregate of the invention | No. 1 | 0.5 | 0 |
|  | No. 2 | 0.4 | 0.2 |
|  | No. 3 | 0.5 | 0.2 |
|  | No. 4 | 0.6 | 0.4 |
| Aggregate for comparison | No. 1 | 4.3 | 0.9 |

The slag penetration depth and the amount of expansion were investigated also on the aggregates of the invention Nos. 5 to 8 and the aggregate for comparison No. 2 under the same test conditions as those mentioned above. The results are shown in Table 6.

TABLE 6

|  |  | Slag penetration depth (mm) | Amount of expansion of aggregate (mm) |
|---|---|---|---|
| Aggregate of the invention | No. 5 | 0.3 | 0 |
|  | No. 6 | 0.5 | 0.3 |
|  | No. 7 | 0.6 | 0.3 |
|  | No. 8 | 0.6 | 0.5 |
| Aggregate for comparison | No. 2 | 5.9 | 1.1 |

As is evident from Table 5, the aggregates of the invention Nos. 1 to 4 are superior to the aggregate for comparison No. 1 in slag penetration resistance, and have a smaller amount of expansion than in the aggregate for comparison No. 1 because of the higher slag penetration resistance. As is evident from Table 6, the aggregates of the invention Nos. 5 to 8 are superior to the aggregate for comparison No. 2 in slag penetration resistance, and have a smaller amount of expansion than in the aggregate for comparison No. 2 because of the higher slag penetration resistance.

According to the present invention, as described above, it is possible to obtain a magnesia aggregate for a refractory article, which is remarkably excellent in slag penetration resistance, thus providing industrially useful effects.

WHAT IS CLAIMED IS:

1. A magnesia aggregate for a refractory article, characterized by comprising:
   a core portion (1) comprising magnesia (MgO);
   a covering layer (2) excellent in slag penetration resistance, which comprises a refractory material excellent in slag penetration resistance and covers the entire surface of said core portion (1); and
   an intermediate layer (3) excellent in slag penetration resistance, formed between said core portion (1) and said covering layer (2) through combination of said core portion (1) and said covering layer (2).

2. The magnesia aggregate for a refractory article as claimed in claim 1, characterized in that:
   said covering layer (2) comprises chromium oxide ($Cr_2O_3$), which forms spinel in combination with magnesia (MgO).

3. The magnesia aggregate for a refractory article as claimed in claim 1, characterized in that:
   said covering layer (2) comprises titania ($TiO_2$) which forms a compound in combination with magnesia (MgO).

4. The magnesia aggregate for a refractory article as claimed in claim 1, characterized in that:
   said covering layer (2) comprises manganese oxide ($MnO_2$) which forms a compound in combination with magnesia (MgO).

5. The magnesia aggregate for a refractory article as claimed in claim 1, characterized in that:
   said covering layer (2) comprises calcium oxide (CaO) which forms a mixture with magnesia (MgO).

6. The magnesia aggregate for a refractory article as claimed in claim 1, characterized in that:
   said covering layer (2) comprises alumina ($Al_2O_3$) which forms spinel in combination with magnesia (MgO).

7. The magnesia aggregate for a refractory article as claimed in claim 1, characterized in that:
   said covering layer (2) comprises magnesium chromate ($MgCrO_4$) which forms spinel in combination with magnesia (MgO).

8. A method for manufacturing a magnesia aggregate for a refractory article, characterized by comprising the steps of:
   preparing a core portion which comprises magnesia (MgO) and has a particle size within the range of from 40 $\mu$m to 10 mm;
   forming, on the entire surface of said core portion, a covering layer excellent in slag penetration resistance, which comprises a powdery refractory material excellent in slag penetration resistance and has a covering thickness within the range of from 20 $\mu$m to 2.0 mm, to prepare a green aggregate having the double structure; and
   firing said green aggregate at a temperature within the range of from 1,700° to 2,200° C. for a period of time within the range of from 4 to 10 hours, to form an intermediate layer excellent in slag penetration resistance between said core portion and said covering layer through combination of said core portion and said covering layer;
   thereby manufacturing a magnesia aggregate for a refractory article, which comprises said core portion, said covering layer and said intermediate layer.

9. The method as claimed in claim 8, characterized in that:
   said core poriton is prepared by heating sludgy magnesium hydroxide ($Mg(OH)_2$) into powdery magnesia (MgO), forming the thus obtained powdery magnesia (MgO) into a formed body having a particle size within the range of from 40 $\mu$m to 10 mm, and firing said formed body into said core portion.

10. The method as claimed in claim 8, characterized in that:
    a single particle having a particle size within the range of from 40 $\mu$m to 10 mm of magnesium carbonate ore ($MgCO_3$) is used as said core portion.

11. The method as claimed in claim 8, characterized in that:

chromium oxide ($Cr_2O_3$) which forms spinel in combination with magnesia (MgO) is used as a material for said covering layer.

12. The method as claimed in claim 8, characterized in that:
    titania ($TiO_2$) which forms a compound in combination with magnesia (MgO) is used as a material for said covering layer.

13. The method as claimed in claim 8, characterized in that:
    manganese oxide ($MnO_2$) which forms a compound in combination with magnesia (MgO) is used as a material for said covering layer.

14. The method as claimed in claim 8, characterized in that:
    calcium oxide (CaO) which forms a mixture with magnesia (MgO) is used as a material for said covering layer.

15. The method as claimed in claim 6, characterized in that:
    alumina ($Al_2O_3$) which forms spinel in combination with magnesia (MgO) is used as a material for said covering layer.

16. The method as claimed in claim 6, characterized in that:
    magnesium chromate ($MgCrO_4$) which forms spinel in combination with magnesia (MgO) is used as a material for said covering layer.

* * * * *